United States Patent
Verstraete et al.

(10) Patent No.: US 6,811,702 B2
(45) Date of Patent: Nov. 2, 2004

(54) PROCESS AND INSTALLATION FOR TREATING A POLLUTED AQUEOUS LIQUID SHOWING A COD VALUE

(75) Inventors: Willy Verstraete, Ghent (BE); Kris Van Hege, Herzele (BE); Dieter Geenens, Aartselaar (BE); Bart De Heyder, Aartselaar (BE); Chris Thoeye, Aartselaar (BE)

(73) Assignees: Aquafin N.V., Aartselaar (BE); Severn Trent Water Ltd., Birmingham (GB)

( * ) Notice: Subject to any disclaimer, the term of this patent is extended or adjusted under 35 U.S.C. 154(b) by 0 days.

(21) Appl. No.: 10/179,293

(22) Filed: Jun. 26, 2002

(65) Prior Publication Data

US 2003/0006189 A1 Jan. 9, 2003

(30) Foreign Application Priority Data

Jun. 26, 2001 (EP) .......................................... 01870137

(51) Int. Cl.[7] .................................................. C02F 3/02
(52) U.S. Cl. ........................ 210/617; 210/623; 210/631; 210/151; 210/195.2
(58) Field of Search .................................. 210/617, 621, 210/623, 626, 631, 150, 151, 195.2, 195.3

(56) References Cited

U.S. PATENT DOCUMENTS

| | | | | |
|---|---|---|---|---|
| 2,308,866 A | * | 1/1943 | Dekema | 210/617 |
| 4,149,994 A | | 4/1979 | Murty | |
| 4,956,093 A | * | 9/1990 | Pirbazari et al. | 210/631 |
| 5,151,187 A | * | 9/1992 | Behmann | 210/195.2 |
| 5,486,292 A | * | 1/1996 | Bair et al. | 210/150 |
| 6,007,712 A | * | 12/1999 | Tanaka et al. | 210/151 |
| 6,056,876 A | * | 5/2000 | Yamasaki et al. | 210/617 |
| 6,461,511 B1 | * | 10/2002 | Baba et al. | 210/151 |

FOREIGN PATENT DOCUMENTS

| | | |
|---|---|---|
| EP | 0 739 859 A1 | 10/1996 |
| EP | 0 812 806 A1 | 12/1997 |
| WO | WO 99/37586 A2 | 7/1999 |

OTHER PUBLICATIONS

Ruffer, et al., "The Use of Biofiltration For Further Wastewater Treatment", Water Science and Technology, 16:241–260 (1984).

Tsujimoto, et al., "Membrane Filtration and Pre–treatment by GAC", Desalination, 119:323–326 (1998).

* cited by examiner

*Primary Examiner*—Christopher Upton
(74) *Attorney, Agent, or Firm*—Browdy and Neimark, P.L.L.C.

(57) ABSTRACT

The invention relates to a process and installation for treating a polluted aqueous liquid having a COD value caused by organic compounds present therein and a BOD/COD ratio smaller than 0.2. To reduce the COD value, the polluted aqueous liquid is percolated through a packed filter bed (7) of a carrier material, in particular of activated carbon, which is colonised with aerobic bacteria and which forms an adsorbent for at least part of said organic compounds. To provide a thin, fully aerated biofilm of bacteria on the carrier material so that no oxygen has to be dissolved under pressure in the liquid, the filter bed is kept at the most partially submerged in the liquid percolating therethrough. The percolate which has passed through the filter bed is collected and a portion of the collected percolate is recirculated to the filter bed whilst a further portion of the collected percolate is removed as treated effluent, preferably by means of a membrane filter (14) withholding the slowly growing specialist bacteria, enabling to remove recalcitrant COD, in the system.

22 Claims, 3 Drawing Sheets

PROCESS AND INSTALLATION FOR TREATING A POLLUTED AQUEOUS LIQUID SHOWING A COD VALUE

The present invention relates to a process for treating a polluted aqueous liquid having a COD value caused by organic compounds present therein and a BOD/COD ratio smaller than 0.2, wherein the polluted aqueous liquid is percolated through a packed filter bed of a carrier material which is colonised with aerobic bacteria, enabling to degrade at least part of said organic compounds under aerobic conditions, and which forms an adsorbent for at least part of said organic compounds, the percolate which has passed through the filter bed is collected and a portion of the collected percolate is recirculated to the filter bed whilst a further portion of the collected percolate is removed as treated effluent showing a reduced COD value.

A BOD/COD (BOD=Biological Oxygen Demand; COD=Chemical Oxygen Demand) ratio smaller than 0.2 means that a considerable portion of the COD of the polluted aqueous liquid is recalcitrant COD or in other words that a considerable fraction of the organic compounds present in the polluted liquid is non-biodegradable. The term "non-biodegradable" is used in practice and in the present specification to indicate organic compounds which are not decomposed or degraded by the micro-organisms in common waste water treatment plants but which can only be decomposed by "specialist micro-organisms" and this only at a relatively low rate. The process according to the invention is in particular directed to the further purification of domestic wastewater which has already been treated biologically, i.e. to the further purification of secondary activated sludge sewage effluent which still comprises typically as major organic constituents protein, carbohydrate, humin, tanin, lignin as well as small amounts of surfactant. The process according to the invention is for example also further directed to the treatment of concentrates of reverse osmosis produced for example during the production of drinking water and containing, in addition to mineral salts, recalcitrant COD which may be caused for example by the presence of herbicides and pesticides. Of course other polluted water streams containing recalcitrant COD, in particular secondary activated sludge effluent from waste water treatment plants of the chemical or pharmaceutical industry, can also be treated.

In practice, the further treatment of such polluted water streams has become more and more important. The shortage and pollution of water resources, coupled to the continuously growing demand for clean water, has required indeed alternative ways of water conservation. By the further treatment of the effluent of waste water treatment plants to remove also non-biodegradable organic compounds therefrom, this effluent could for example be used in process water and ground water recharge applications.

WO99/37586 discloses a process for the further purification of wastewater which has already been pretreated physico-chemically and biologically. In the examples given, the pretreated waste water has a COD value of about 500 mg/l and a BOD value smaller than 15 mg/l indicating the presence of a large amount of recalcitrant COD. In this known process, the contaminated water which contains a considerable amount of non-biodegradable organic compounds is mixed with process effluent and is percolated through a filter bed of activated carbon contained in a closed reactor system. The activated carbon acts first of all as an adsorbent and as a catalyst for the biochemical oxidation of the organic compounds present in the contaminated water. An in-situ regeneration of the activated carbon is provided by colonising it with bacteria. These bacteria provide for an aerobic biological decomposition of the organic compounds. In order to provide the necessary aerobic conditions for these aerobic decomposition processes, oxygen from air or from another oxygen containing gas is dissolved in the mixture of contaminated water and process effluent which is fed into the reactor. As a result of the biological decomposition processes, the life span of the activated carbon is increased or in other words the necessary replacements of the activated carbon filter can be delayed.

In order to avoid a too high accumulation of the organic compounds in the filter bed, WO99/37586 discloses to increase the amount of oxygen dissolved in the mixture of contaminated water and effluent by pressurising this mixture to a pressure of 1 to 10 bars, preferably 1 to 3 bars above atmospheric pressure before saturating it with air. In this way an oxygen content of 10 to 100 mg $O_2$/l, more particularly an oxygen content of 10 to 40 mg $O_2$/l is achieved. The filter bed is further contained in a pressure vessel wherein the pressurised mixture is kept at a substantially constant pressure so that the increased oxygen concentration is maintained in the mixture of contaminated water and effluent. Due to the increased amount of oxygen in this mixture, the efficiency of the aerobic biological decomposition processes occurring in the filter bed is enhanced and accumulation of organic compounds can thus be slowed down.

A drawback of the process disclosed in WO99/37586 is that not only sufficiently powerful pumps are required to pressurise the mixture of contaminated water and effluent and the gas to be introduced in this mixture, but the filter or reactor vessel and the attendant conduits have moreover to be constructed to withstand the applied pressures. A further drawback of this known process is that a quite expensive saturation unit is required for intimately dispersing oxygen into the pressurised mixture of contaminated water and process effluent to dissolve oxygen into this mixture until it is saturated.

An object of the present invention is therefore to provide an alternative way for increasing the efficiency of the biological decomposition processes in the filter bed which does not require a saturation unit nor a pressurisation of the system.

To this end, the process according to the invention is characterised in that the filter bed is kept at the most partially submerged in the liquid percolating therethrough.

In the non-submerged part of the filter bed, the liquid fed to the filter bed flows between the particles of the carrier material leaving open pores filled with air. This air provides aerobic conditions that enable the bacteria colonising the particles of the carrier material in this part of the filter bed to perform the required aerobic decomposition processes. An advantage of at least partially not submerging the filter bed is that a higher activity of the bacteria is obtained without having to increase the amount of dissolved oxygen by pressurising to system. Indeed, it has been found that in the non-submerged part of the filter bed the bacteria grow in the form of a thin biofilm which is fully aerated. Compared to a thick biofilm, the efficiency of a thin fully aerated biofilm for performing the required aerobic decomposition processes is considerably larger.

This increased efficiency can be explained by the fact that there is only a relatively small concentration gradient of nutrients, oxygen etc. between the inner and the outer side of the film. This means that there does not have to be a large excess of oxygen in the liquid to enable an optimum metabolisation of the bacteria and that the oxygen in the air present in the pores of the non-submerged part of the filter bed can efficiently be taken up by the bacteria. A thin biofilm moreover does not substantially hamper the adsorption of the organic compounds into the pores of the carrier particles since only a small concentration gradient is required over this biofilm. Vice versa, also the supply of organic compounds adsorbed in the pores of the carrier to the bacteria is substantially not hampered by the biofilm. The bacteria in the biofilm have therefore not only constantly a sufficient supply of oxygen but dispose moreover over a source of organic compounds, namely the organic compounds adsorbed in the carrier material, containing an increased concentration of organic compounds.

In an advantageous embodiment of the process according to the invention, said further portion or in other words the treated effluent is removed from the collected percolate, which comprises a concentration of bacteria, by means of a separation device withholding the bacteria in the collected percolate to such an extend that the further portion which is removed from the collected percolate comprises a concentration of bacteria which is smaller than 10%, preferably smaller than 1%, of the bacterial concentration in the recycled percolate. In other words, the concentration of bacteria in the collected percolate is 1 log larger than, preferably 2 log larger than the bacterial concentration in the effluent. Preferably, the separation device comprises a membrane filter, in particular a micro-filtration or ultra-filtration membrane filter.

An advantage of arranging such a separation device downstream the filter bed is that specialist bacteria, which have developed onto the carrier material of the filter bed and which are able to decompose specific organic compounds which are normally non-biodegradable, are kept in the system and are recycled to the filter bed. Such a recycling offers the possibility to increase the concentration of specialist bacteria on the packed filter bed to a value required for achieving an optimal bacterial activity. In view of the normally low specific growth rate of such specialist bacteria compared to other bacteria (e.g. days instead of hours), this bacterial concentration is otherwise not easy to be reached. This is due to the fact that the specialist bacteria grow on organic compounds that are hard to metabolise.

In a preferred embodiment of the process according to the invention, at least said portion of the collected percolate which is recirculated to the packed filter bed is aerated with an oxygen containing gas, in particular with air, before recirculating it to the packed filter bed.

In this way, a larger concentration of oxygen is obtained in the liquid mixture percolating through the packed filter bed resulting therefore in a higher activity of the bacteria. According to the invention, the aeration can be carried out under atmospheric pressure or under a higher pressure in case a higher oxygen concentration is desired. A higher pressure may also be used to increase the flow rate of the liquid mixture through the packed filter bed.

The present invention also relates to an installation for treating a polluted aqueous liquid in accordance with the process according to the invention. This installation is characterised in that it comprises means for controlling the flow of liquid into and/or out of the filter bed to keep the filter bed at the most partially submerged in the liquid percolating therethrough.

Other particularities and advantages of the invention will become apparent from the following description of some particular embodiments of the process and the installation according to the present invention. The reference numerals used in this description relate to the annexed drawings wherein.

Figure 1:
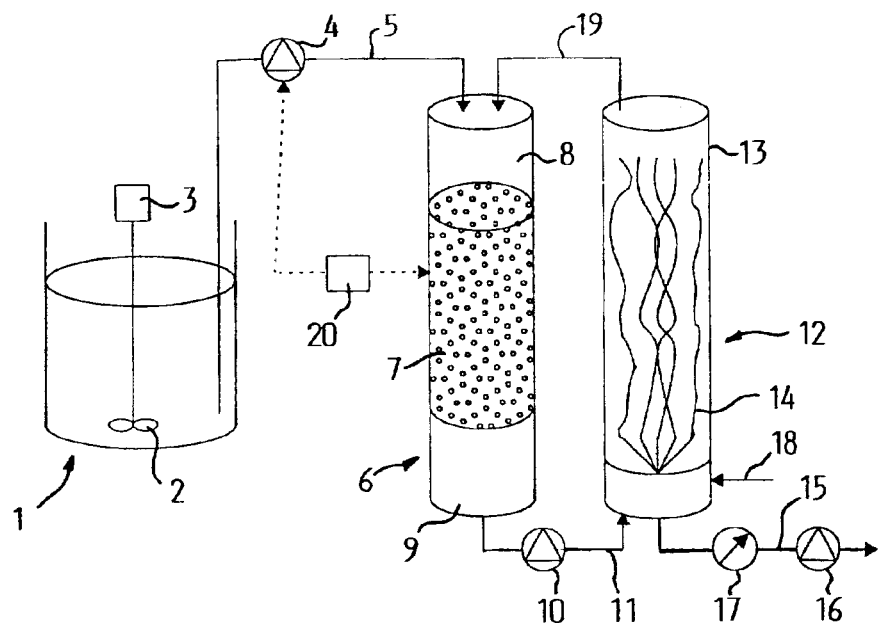
FIG. 1 is a diagrammatic view of an experimental set-up or lab-scale installation for carrying out the process according to the invention.

In the process according to the invention, a polluted aqueous liquid which comprises recalcitrant COD or in other words non-biodegradable organic compounds is treated in order to decompose at least a portion of these compounds to lower the COD value of the liquid. The polluted liquids show a BOD/COD ratio lower than 0.2 or even lower, for example lower than 0.15 or 0.10. Normal wastewater from domestic or industrial origin show a larger BOD/COD ratio and is thus suitable for being treated in conventional wastewater treatment plants (WWTP) wherein the wastewater is treated physico-chemically and biologically. The effluent of such WWTP is called secondary sewage effluent and shows a smaller BOD/COD ratio since most of the biodegradable organic compounds are removed therefrom. However, it still contains a number of pollutants, including non-biodegradable organic compounds, which makes this effluent not suitable for reuse as process water or for ground water recharge applications. Other polluted aqueous liquids which contain recalcitrant COD and which show a BOD/COD ratio lower than 0.2 are for example the concentrates of reverse osmosis processes, generated for example during the production of drinking water and containing, in addition to mineral salts often non-biodegradable organic compounds such as herbicides and pesticides.

For determining the BOD value (Biological Oxygen Demand) and the COD value (Chemical Oxygen Demand) of polluted water, standard methods exist which are described for example in American public health association (APHA), Standard methods for the examination of water and wastewater. 18 ed., A. E. Greenberg, L. S. Clesceri, and A. D. Eaton (eds). Washington: APHA (1992).

In the process according to the invention, the polluted water is percolated through a packed filter bed of a carrier material which is colonised with aerobic bacteria which enable to degrade at least part of the non-biodegradable organic compounds under aerobic conditions. These bacteria are so-called specialist bacteria which grow or develop usually much slower than the bacteria in conventional activated sludge water purification installations for the biological treatment of domestic wastewater.

In order to enable these specialist bacteria to break down the non-biodegradable organic compounds, the BOD/COD ratio of the polluted water should be sufficiently low, in particular lower than 0.2, in order to avoid a competition, or at least a too strong competition, with the other bacteria which decompose biodegradable organic compounds and which can thus grow or develop much quicker than the specialist bacteria. The carrier material should further form an adsorbent for at least part of the organic compounds in the polluted water so that these compounds are withdrawn from the water and concentrated on the surfaces of the carrier material. In this way, these compounds can more efficiently be decomposed by the bacteria colonising this carrier material.

Carrier materials which are able to adsorb dissolved organic compounds and which can be used in the process according to the present invention are activated carbon containing materials, activated carbon itself, lignite, zeolites, and synthetic adsorbent materials. According to the invention, preference is given to an activated carbon containing material, in particular to activated carbon. The adsorption capacity of the carrier material can be quantified by means of the so-called Iodine number which is measured according to AWWA B604-74 (American Waste Water Association Specifications for granular activated carbon) and which shows a correlation with the internal surface (BET-surface developed by Brunauer, Emmett and Teller). Preferably, the carrier material shows a Iodine number of at least 500 mg/g and preferably of at least 800 mg/g.

FIG. 1 shows an experimental set-up, or lab-scale installation, by means of which tests have been carried out to test the efficiency of the process according to the present invention.

This lab-scale installation comprises a feed tank 1 containing the polluted aqueous liquid to be treated. The feed tank is provide with an agitator 2 driven by a motor 3. By means of a pump 4 arranged in a conduit 5 the polluted liquid is pumped at a predetermined flow rate to the reactor 6 containing the packed filter bed 7. This filter bed is preferably formed by biological granular activated carbon (GAC). On top of the filter bed 7 a diffuser 8 is provided which distributes the liquid fed to the reactor 6 over the top of the filter bed 7. This diffuser 8 is for example composed of a large number of small tube sections. Instead or in addition to a diffuser 8, it is also possible to distribute the liquid by spraying over the top of the filter bed 7. Below the filter bed 1 a course filter layer 9 of plastic matrices or a screen is arranged in the reactor 6 so that the particles of the filter bed are kept in the reactor without hampering the passage of the percolate flowing out of the filter bed 7.

At the bottom of the reactor 6, the percolate which has passed through the filter bed 7 is collected and is pumped by means of a pump 10 disposed in a conduit 11 to a closed membrane module 12. This membrane module 12 comprises a vessel 13 wherein a number of tubular membranes 14 are arranged. The interior of these tubular membranes is connected to a conduit 15 wherein a pump 16 is arranged to pump permeate which has passed through the membranes out of the membrane module 12. The conduit 15 is further provided with a pressure gauge 17 to monitor the so-called transmembrane pressure (TMP).

At the bottom of the vessel 13 an air inlet 18 is provided by means of which pressurised air or another oxygen containing gas can be fed into the membrane module 12 to dissolve oxygen into the percolate collected therein. Into the membrane module 12, a distributor (not shown) is arranged to distribute the introduced air over the cross-sectional area of the module 12. This air will flow along the tubular membranes so that it does not only increase the amount of oxygen dissolved in the percolate but also contributes in preventing fouling of the membranes.

At the top, the membrane module 12 is connected by means of a conduit 19 to the top of the GAC reactor 6. Since the membrane module 12 is closed, the recirculation of liquid through this conduit 19 to the reactor 6 can be effected by means of the pump 10 pumping the percolate from the reactor 6 to the membrane module 12. Of course, it is also possible to arrange a further pump in the conduit 19, especially in case the vessel 13 of the membrane module 12 would not be closed. In a variant embodiment, the reactor 6 could be arranged concentrically around the vessel 13 of the membrane module 12 and the liquid in the vessel 13 could be allowed to flow over from the vessel 13 into the reactor 6. This liquid flow could be achieved by airlift technology, i.e. by means of the air introduced in the bottom of the vessel 13, instead of by means of the pump 10.

An essential feature of the process according to the invention is that the filter bed 7 is kept at the most partially submerged in the liquid percolating therethrough. In the lab-scale installation illustrated in FIG. 1, this is achieved by means of a level control 20 including a sensor for sensing the fluid level in the reactor 6 and means for controlling the operation of the pump 4 in the conduit between the feed tank 1 and the reactor 6 to increase the flow rate of the influent when the liquid level in the reactor drops below a predetermined minimum level and to reduce the flow rate of the influent when the liquid level in the reactor 6 exceeds a predetermined maximum level. Advantageously, at least 20 volume % of the carrier material, preferably at least 30 volume % and most preferably at least 50 volume % of the carrier material is kept non-submerged in the liquid percolating therethrough. In practice, it is even possible to keep substantially the entire filter bed non-submerged. As explained hereabove, it has been found that non-submerging at least part of the carrier material of the filter bed is an effective solution to achieve a higher biological activity by creating thin and fully aerated biofilms which are kept relatively dry.

On top of the packed filter bed 7, a layer of an oxygen containing gas, in particular a layer of air is maintained. In the embodiment illustrated in FIG. 1, this layer of air coincides with the layer of diffuser elements 8. Usually, this layer will be at atmospheric pressure but it is also possible to pressurise this gas layer, for example to increase the flux through the filter bed 7 in view of lowering the liquid level in the filter bed 7.

A further essential feature of the process according to the invention is that a portion of percolate, which is collected at the bottom of the filter bed 7, is recirculated to the filter bed whilst a further portion of the collected percolate is removed as treated effluent. By recirculating a portion of the percolate, an enhanced mineralisation is obtained in the biofilms and therefore a decreased biofilm sludge production and fouling of the filter bed. Moreover, due to the fact that in the process according to the invention at least a portion of the filter bed is kept non-submerged, there is a considerably decreased contact time between the liquid and the carrier material compared to the prior art processes wherein the entire filter bed is kept submerged in the liquid to enable the carrier material to adsorb as much as possible pollutants from the polluted liquid. According to the invention, it has however been found that due to the thin fully aerated biofilms a residence time of the liquid in the filter bed sufficient to achieve the required adsorption on the carrier and biological degradation of the organic compounds can nevertheless be obtained by recirculating a portion of the percolate back to the filter bed. Advantageously, at least 50%, preferably at least 70% and most preferably at least 80% of the collected percolate is recirculated to the packed filter bed. A higher degree of recirculation can be selected to achieve a stronger reduction of the COD value. On the other hand, the degree of recirculation can also be adjusted to increase or decrease the moisture content of the carrier material in the non-submerged part of the filter bed: the higher the flow rate of liquid through this part, the more the pores will be filled with liquid.

The pore size, and therefore the volume of air in the carrier material in the non-submerged part of the filter bed, also depends on the particle size of the carrier material. This carrier material is preferably formed of a granular carrier material composed of particles, at least 95% of which show in particular a particle size larger than 0.3 mm (mesh-size 50 according to ASTM E11-87), preferably larger than 0.5 mm (mesh-size 35), but smaller than 5.6 mm (mesh-size 3.5), preferably smaller than 2.8 mm (mesh-size 7).

As illustrated in FIG. 1, the polluted aqueous liquid is preferably percolated through the filter bed together with the portion of the collected percolate which is recirculated to the filter bed. In this way, the recirculated percolate dilutes the incoming polluted liquid and in particular the concentration of compounds which may hamper the growth of the bacteria. The polluted liquid may be added discontinuously, preference being given however to a continuous flow of influent into the filter bed, more particularly at a flow rate which is substantially equal to the flow rate of effluent out of the system.

In the prior art process disclosed in WO99/37586, the treated effluent is simply tapped of the vessel containing the collected percolate without any particular separation device. In the process according to the present invention, a particular preference is however given to the use of a separation device which withholds bacteria for removing the effluent from the collected percolate. Since the filter bed is colonised with bacteria, it will indeed be clear that some of these bacteria will arrive in the collected percolate. The separation device should preferably withhold the bacteria in the collected percolate to such an extend that the further portion or effluent which is removed from the collected percolate comprises a concentration of bacteria which is smaller than 10%, preferably smaller than 1%, of the bacterial concentration in the collected percolate. In other words, the separation device should preferably reduce the bacterial concentration with 1 log, more preferably with 2 log. An important advantage of the use of such a separation device is that the "loss" of specialist bacteria via the effluent is reduced and that most of the bacteria are recirculated to the filter bed. In this way, the amount of specialist bacteria in the filter bed, or the age thereof, is increased so that a more efficient biodegradation can be achieved. As separation device use can be made of different types of devices, for example centrifuges, but preference is given to membrane filtration devices as illustrated in FIG. 1, in particular to micro- or ultrafiltration membrane filters. In general, ultra-filtration membranes have pore sizes of between 0.01 and 0.1 $\mu$m whilst micro-filtration membranes have pore sizes of between 0.1 and 1 $\mu$m. In the process according to the present invention, micro-filtration membrane filters are preferred since they are fine enough to withhold bacteria. Micro- or even ultra-filtration membranes are however still not fine enough to withhold the dissolved organic compounds present in WWTP effluent so that the biological filter bed is still required to remove these compounds.

A problem with packed filter beds and membrane filters is that they can become clogged or fouled. As described already hereabove with reference to the lab-scale installation illustrated in FIG. 1, fouling of the membranes can be reduced by aerating the collected percolate in the membrane module 12 with an oxygen containing gas, in particular with air, and by allowing this gas to rise in the collected percolate along the membranes of the membrane filter. A further advantage of the aeration of the collected percolate is that the portion recycled to the filter bed contains a larger amount of oxygen thus enhancing the biodegradation of the organic compounds.

Fouling of the membrane filter is also reduced by the presence of the packed filter bed which withholds most of the suspended solids. In this respect, it should be noted that back-washing of the filter bed should be restricted since such back-washing disturbs the filter capacity. For the same reason, aeration of the filter bed by means of air blow in counter current in the bottom of the filter bed is not an option to provide the required aerobic conditions in the filter bed. In order to avoid clogging of the filter bed itself, the polluted liquid preferably contains less than 35 mg/l, and most preferably less than 20 mg/l suspended solids. Should the polluted liquid contain more suspended solids, a prior separation of suspended solids, for example by means of a centrifuge or an additional settling step is preferably carried out.

EXAMPLE

1. Set-up of the Lab-scale Installation

The combined BioMAC installation (Biological Membrane Assisted Carbon filtration) used in this example and described hereabove with reference to FIG. 1 consisted of two unit processes, biological granular activated carbon filtration and microfiltration. Waste water (WWTP effluent) was pumped into the first (GAC) column or reactor 6 and percolated through it. Subsequently, it is pumped into the second micro-filtration column, where part was filtered and part was recirculated over the first column.

The first column (total H=40 cm; diameter=10 cm) contained 0.5 kg (1 l) granular activated carbon, with characteristics as mentioned in Table 1. The waste water was diffused over diffusers (upper 10 cm), percolated through the GAC (middle 15 cm) and collected at the bottom of the column (bottom 10 cm). The GAC filter was kept 30 volume % non-submerged by a level control 20 directing the feed pump 4. The active volume of the first column was 2 l.

TABLE 1

Characteristics of the activated carbon filter bed

| Unit process | Parameter | Value |
| --- | --- | --- |
| GAG reactor | Type | Lurgi Hydrafin CC 8 × 30 |
|  | Density (kg/m$^3$) | 480 ± 50 |
|  | Particle size (mm) | 0.5–2 |
|  | Iodine number (mg/g) | 950 |

The second column (total H 40 cm; diameter=8 cm) contained the MF membranes (Table 2). The volume of this column is 2 L. The waste water is pumped upwards through the column; a part of it is recycled over the GAC reactor and another part is microfiltered. During the entire experiment, air was injected at the bottom of the second column at a flow rate of about 2 L per minute. The characteristics of the membranes are mentioned in Table 2.

TABLE 2

Characteristics of the membranes.

| Membrane module | Type | Zenon Zeeweed ® |
| --- | --- | --- |
|  | Material | proprietary |
|  | Surface (m$^2$) | 0.1 |
|  | Pore size ($\mu$m) | 0.4 |

Initially, the permeate flow through the membranes was set at 2 l/h; taking into account the surface of the membranes, this corresponded to a flux of 20 l/h*m$^2$. Hence, the influent flow rate (Q) from the feed tank 1 was also set at 2 l/h. The flow rate of the recycle pump 10 ($Q_R$) was set at 12 l/h, resulting in a recycle ratio $Q_R/Q$ of 6. Transmembrane pressure (TMP) was measured by the pressure gauge 17 and was set at a maximum of 10 kPa. The reactor was operated at room temperature (22±2° C.).

2. Experimental Description and Results

For the experiments, WWTP effluent, obtained from the municipal WWTP's of Ghent and Wetteren (Belgium), was used. Sewage treatment in both plants consisted of primary sedimentation, followed by conventional activated sludge treatment and gravitational clarification. To obtain different reactor input concentrations, varying ratios of influent and effluent from the WWTP's were mixed prior to feeding to the experimental set-up. The BioMAC reactor was operated continuously for 114 days with only WWTP effluent, and from day 115 to 129 with effluent spiked with influent to obtain higher input concentrations (shock load experiment), and a number of physico-chemical parameters were measured. Analytical results for the pH, phosphate, sulphate, fluoride, chloride, bromide, TAN, nitrite, nitrate and COD are listed in Table 3.

TABLE 3

| Parameter | Unit | Feed | Permeate | n |
|---|---|---|---|---|
| pH | / | 7.71 ± 0.26 | 8.05 ± 0.22* | 72 |
| $PO_4^{3-}$—P | mg $l^{-1}$ | 0.96 ± 0.31 | 0.92 ± 0.30 | 22 |
| TAN | mg $l^{-1}$ | 0.30 ± 0.62 | 0.030 ± 0.026* | 47 |
| $NO_2^-$—N | mg $l^{-1}$ | 0.37 ± 0.79 | 0.029 ± 0.050* | 36 |
| $NO_3^-$—N | mg $l^{-1}$ | 3.85 ± 1.57 | 3.71 ± 1.46 | 40 |
| COD | mg $O_2$ $l^{-1}$ | 13.7 ± 5.0 | 5.26 ± 3.18* | 48 |

Measured values of pH, phosphate, sulphate, TAN, nitrite, nitrate and COD of the feed and permeate of the BioMAC reactor during the continuous run (first 114 days).
Values are noted as average *SD. n = number of samples. *= Significantly different from the feed, p < 0.01.

Figure 2:
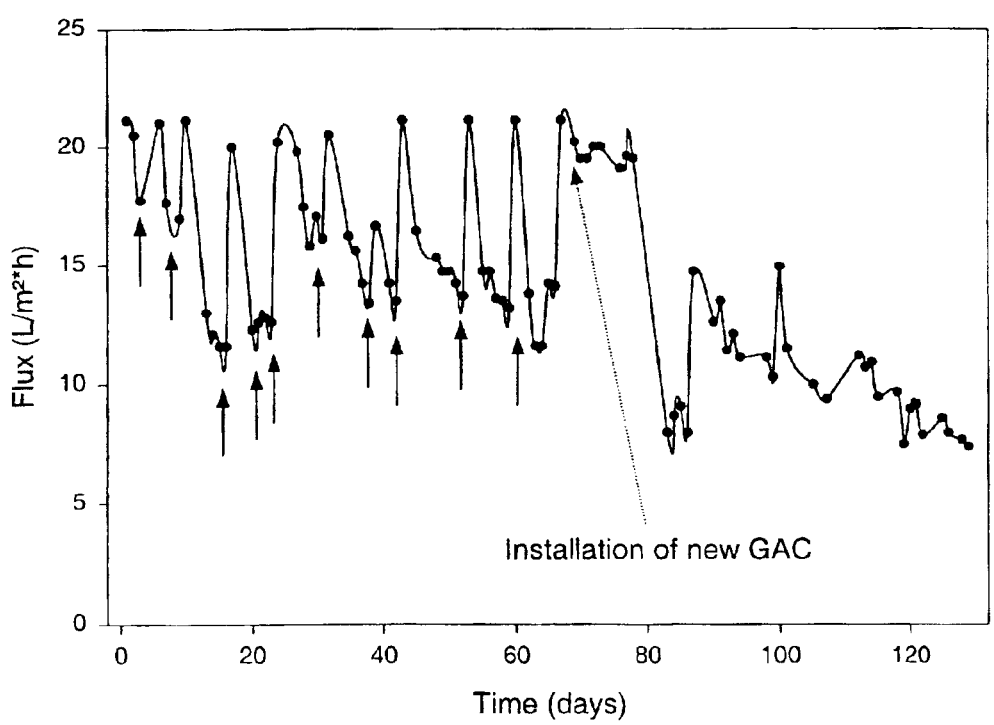
FIG. 2 shows the flux decline in the experimental set-up illustrated in FIG. 1 and this in an experiment wherein the process according to the invention was carried out for a period of 129 days.
Figure 3:
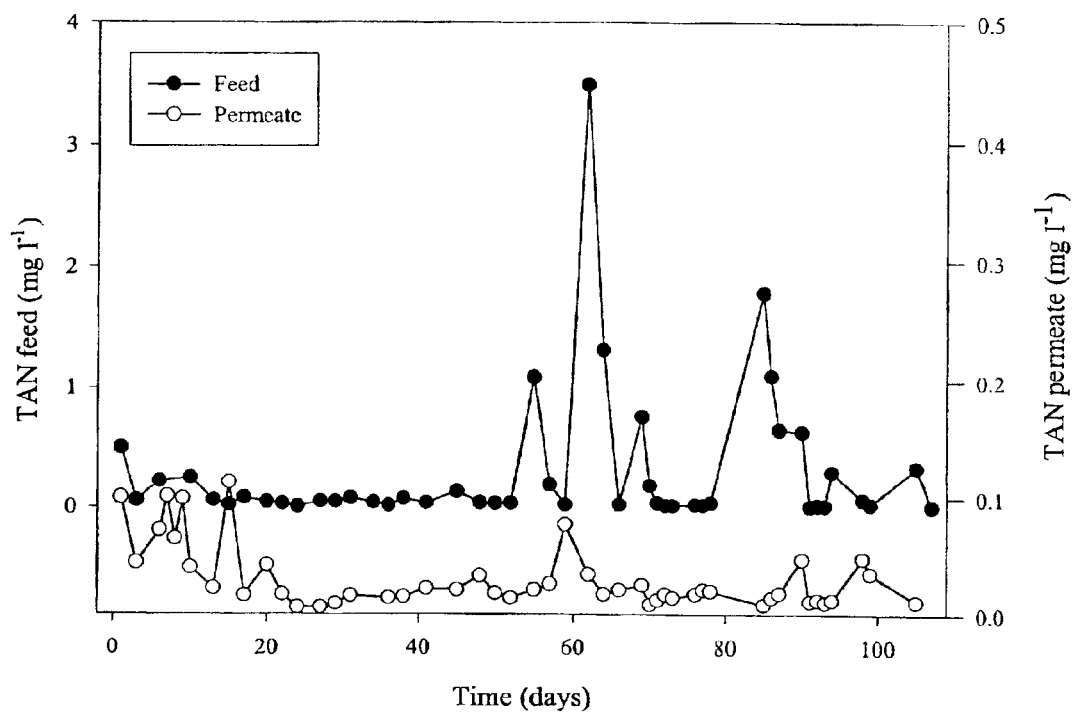
FIG. 3 illustrates the evolution of the TAN (Total Ammonia Nitrogen) concentration of feed and permeate (mg/l) in the same experiment.
Figure 4:
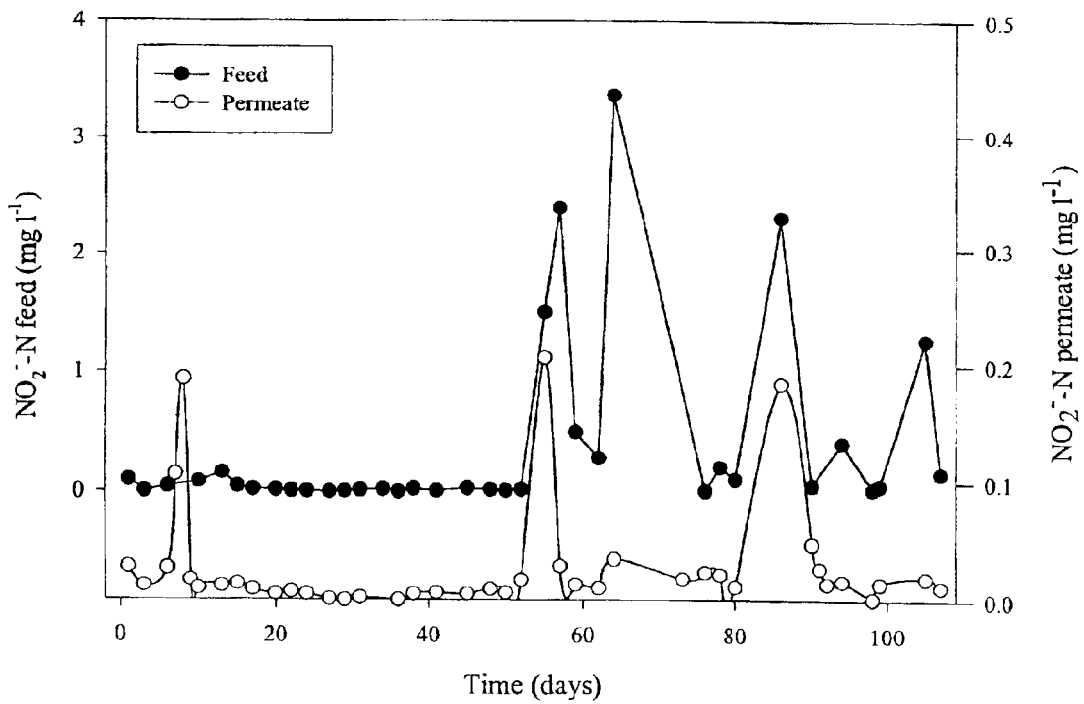
FIG. 4 illustrates the evolution of the nitrite concentration of feed and permeate (mg/l) in this experiment.
Figure 5:
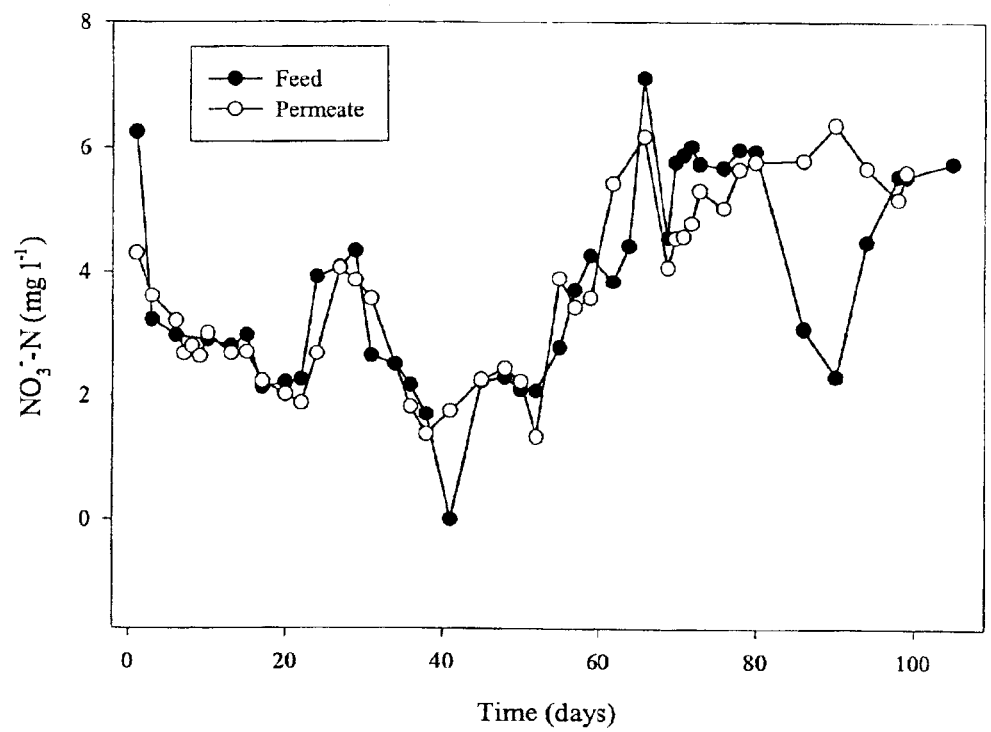
FIG. 5 illustrates the evolution of the nitrate concentration of feed and permeate (mg/l) in this experiment.
Figure 6:
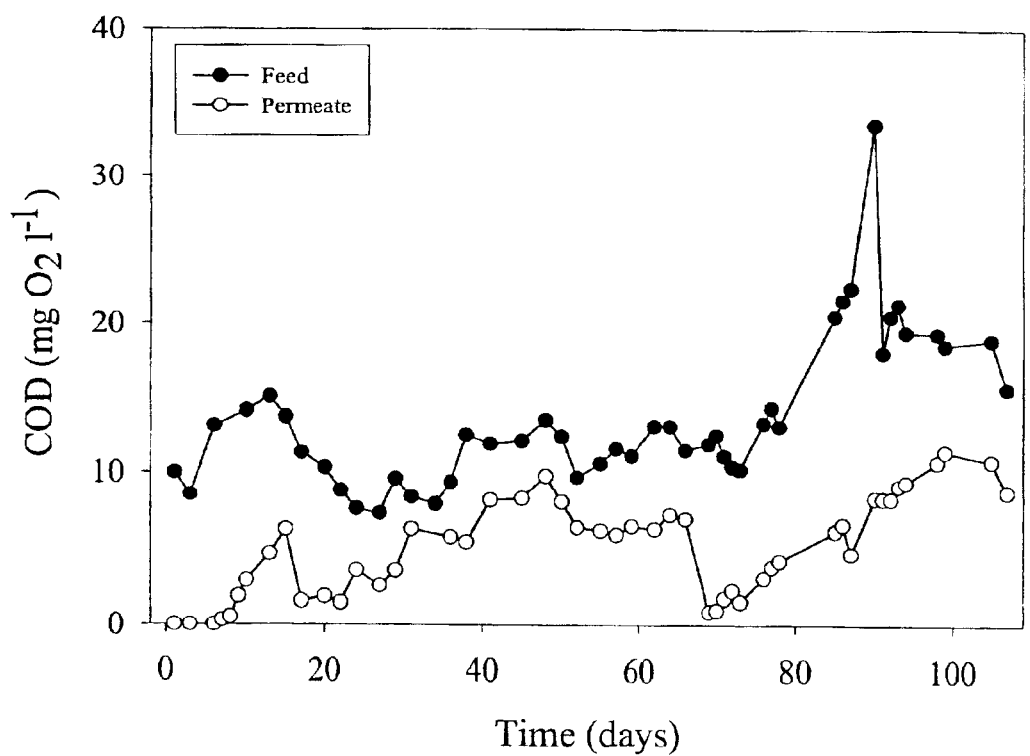
FIG. 6 illustrates the evolution of the COD concentration of feed and permeate (mg/l).

Results for the flux through the membrane module and for the analyses of TAN, nitrite, nitrate and COD are shown in FIGS. 2 to 6. FIG. 2 shows the flux decline for the entire period of 129 days. Backwash cycles of the membrane filter (with permeate: 15 minutes at 4 l/h or air: 15 minutes at 400 kPa) were carried out on the days indicated by the arrows. On day 67, the GAC filter was replaced as indicated by the dotted arrow and the membranes were cleaned manually and subjected to a combined acid/caustic backwashing. No more backwashing was performed from day 100 on; the flux gradually decreased to 8 l/m²h. FIG. 3 shows the feed and permeate concentrations for TAN. It is apparent that permeate TAN concentrations do not exceed 0.1 mg $l^{-1}$ TAN, while an average TAN-removal of 90% and a ratio $SD_{feed}/SD_{permeate}$ of 24 could be calculated (SD: standard deviation). In FIG. 4, the nitrite concentrations of the BioMAC feed and permeate are indicated. Permeate nitrite concentrations are below 0.2 mg $l^{-1}$ and the average removal and ratio of input to output SD were found to be 92% and 16, respectively. The high ratios between the standard deviations for TAN and nitrite substantiate the stability and robustness of the nitrification process as a ratio substantially larger than 1 is considered to be indicative for stable process performance. For the nitrate concentrations, no notable difference could be observed between the input and output nitrate concentrations, as displayed in FIG. 5. In FIG. 6, the COD concentrations of feed and permeate are shown. Initially, COD removal was complete, but from day 10 on, a gradual increase of the permeate concentration could be observed (maximum permeate COD of 9.76 mg $O_2$ $l^{-1}$ on day 48). Replacement of the GAC filter on day 67 brought about a sharp decrease in permeate COD concentration, but a subsequent increase was noticed (maximal permeate COD of 11.4 mg $O_2$ $l^{-1}$ on day 99). An average COD-removal of 62% was observed and the ratio $SD_{feed}/SD_{permeate}$ was found to be 1.6.

Notwithstanding the small COD value of the influent during the first 114 days, a high COD removal could still be obtained. As illustrated in Table 4, an even higher COD removal was obtained in the subsequent shock load experiment wherein addition of WWTP influent to the reactor feed gave rise to a major COD increase. The results of the COD values measured in the feed and the permeate are indicated in Table 4.

TABLE 4

| Day | $COD_{feed}$ (mg $O_2$/L) | $COD_{permeate}$ (mg $O_2$/L) |
|---|---|---|
| 115 | 84.2 | 3.88 |
| 116 | 54.0 | 3.94 |
| 117 | X | 5.45 |
| 118 | 40.0 | 3.88 |
| 119 | 20.8 | 2.88 |
| 122 | 23.7 | 5.29 |
| 123 | 32.3 | 4.80 |
| 124 | 21.2 | 5.93 |
| 125 | 20.4 | 4.88 |
| 129 | 30.3 | 5.86 |
| Avg | 36.3 | 4.68* |
| SD | 21.1 | 1.00 |

Measured values of the COD (feed and permeate) of the BioMAC reactor during the shock load expirement (day 115 to 129).
Values are noted as average ± SD (standard deviation). *Significantly different from the feed, p ≦ 0.01. X = not determined.

During the shock load experiment the average permeate COD was significantly lower, an average COD removal of about 87% was achieved. The ratio $SD_{feed}/SD_{permeate}$ was found to be 21.1.

During the experiment, the reactor feed and permeate were assessed with regard to total coliforms and *E. coli* removal efficiency. An average removal or 3.6 $\log_{10}$ CFU and 2.5 $\log_{10}$ CFU was observed for total coliforms and *E. coli*, respectively.

As to the aerobic conditions in the filter bed, the dissolved oxygen in the percolate leaving the filter bed was measured. The average concentration of dissolved oxygen comprised 5.3 mg $O_2$/l.

In addition to the above described parameters, also electronic nose measurements were carried out to measure the presence of odours or volatile compounds both in the feed and the permeate during the shock load experiment. It was found that odours were successfully removed to a level comparable to the reference samples (potable water).

What is claimed is:

1. A process for treating a polluted aqueous liquid having a COD value caused by organic compounds present therein and a BOD/COD ratio smaller than 0.2, wherein
    the polluted aqueous liquid is percolated through a packed filter bed of a carrier material which is colonized with a first concentration of aerobic bacteria, enabling degrading of at least part of said organic compounds under aerobic conditions, and which forms an adsorbent for at least part of said organic compounds,
    the percolate which has passed through the filter bed is collected and separated with a membrane filter into a first portion of the collected percolate which is recirculated to the filter bed, and a second portion of the collected percolate which is removed as treated effluent showing a reduced COD value, wherein said filter bed is kept at most only partially submerged in the liquid percolating therethrough, wherein said second portion is removed from the collected percolate has a second concentration of aerobic bacteria which is smaller than 10% of the first concentration of aerobic bacteria; and wherein an oxygen-containing gas is supplied to the collected percolate, and said oxygen containing gas is allowed to rise in the collected permeate along said membrane filter.

2. A process for treating a polluted aqueous liquid having a COD value caused by organic compounds present therein and a BOD/COD ratio smaller than 0.2, wherein:

the polluted aqueous liquid is percolated through a packed filter bed of a carrier material, the filter bed being kept at most only partially submerged in the liquid percolating therethrough and the carrier material being colonized with aerobic bacteria capable of degrading at least part of said organic compounds under aerobic conditions, and forming an adsorbent for at least part of said organic compounds;

the percolate which has passed through the filter bed and which comprises a first concentration of bacteria is collected;

the collected percolate is separated by a membrane filter to provide a first portion and a second portion, the second portion comprising a second concentration of bacteria which is smaller than 10% of the first bacterial concentration, and the first portion is aerated with an oxygen containing gas which is allowed to rise in the collected percolate along the membrane filter; and the aerated first portion is recirculated to the filter bed whilst the second portion is removed as treated effluent showing a reduced COD value.

3. A process according to claim 2, wherein at least 20 volume % of the carrier material is kept non-submerged in the liquid percolating therethrough.

4. The process of claim 3, wherein at least 30 volume % of the carrier material is kept non-submerged in the liquid percolating therethrough.

5. The process of claim 4, wherein at least 50 volume % of the carrier material is kept non-submerged in the liquid percolating therethrough.

6. A process according to claim 2, wherein said packed filter bed is formed of a granular carrier material composed of particles, at least 95% of said particles having a particle size larger than 0.3 mm but smaller than 5.6 mm.

7. The process of claim 6, wherein said particle size is larger than 0.5 mm and smaller than 2.8 mm.

8. A process according to claim 2, wherein said carrier material is selected from the group consisting of activated carbon or activated carbon containing material, lignite, zeolites, and synthetic adsorbent material.

9. The process of claim 8, wherein said carrier material is activated carbon.

10. A process according to claim 2, wherein said carrier material shows a Iodine number, measured according to AWWA B604-74, of at least 500 mg/g.

11. The process of claim 10, wherein said Iodine number is at least 800 mg/g.

12. A process according to claim 2, wherein a layer of an oxygen containing gas is maintained on top of the packed filter bed, said layer being kept substantially at atmospheric pressure or greater than atmospheric pressure.

13. A process according to claim 2, wherein said polluted aqueous liquid is percolated through the filter bed together with said aerated first portion which is recirculated to the filter bed.

14. A process according to claim 2, wherein said second concentration of bacteria is smaller than 1% of the first bacterial concentration.

15. A process according to claim 2, wherein said membrane filter is a micro-filtration or an ultra-filtration membrane filter.

16. A process according to claim 2, wherein said oxygen containing gas is air.

17. A process according to claim 2, wherein at least 50% of the collected percolate is recirculated to the packed filter bed.

18. The process of claim 17, wherein at least 70% of the collected percolated is recirculated to the packed filter bed.

19. The process of claim 18, wherein at least 80% of the collected percolated is recirculated to the packed filter bed.

20. A process according to claim 2, wherein the oxygen containing gas introduced in the first portion of the collected percolate exerts an upward force onto the first portion of the collected percolate and the first portion of the collected percolate is recirculated by said upward force to the filter bed.

21. An installation for treating a polluted aqueous liquid showing a COD value caused by organic compounds present therein and a BOD/COD ratio smaller than 0.2, comprising:

a reactor with a packed filter bed of a carrier material which is arranged to be colonized with aerobic bacteria, enabling to degrade at least part of said organic compounds under aerobic conditions, and which forms an adsorbent for at least part of said organic compounds, means for feeding the polluted aqueous liquid to the filter bed, means for collecting percolate which has passed through the filter bed and which comprises a first concentration of bacteria, means for controlling the flow of liquid into and/or out of the filter bed to keep the filter bed at most only partially submerged in the liquid percolating therethrough, a membrane filter for separating the collected percolate into a first portion and a second portion, the second portion comprising a concentration of bacteria which is smaller than 10% of the bacterial concentration in the collected percolate, means for aerating the first portion of the collected percolate with an oxygen containing gas and for allowing the oxygen containing gas to rise in the collected percolate along the membrane filter, means for recirculating the aerated first portion to the filter bed, and means for removing the second portion of the collected percolate as treated effluent showing a reduced COD value.

22. An installation according to claim 21, wherein said membrane filter is a micro-filtration or ultra-filtration membrane filter.

* * * * *